United States Patent
Banker et al.

(10) Patent No.: US 9,174,637 B2
(45) Date of Patent: Nov. 3, 2015

(54) METHODS AND SYSTEMS FOR TORQUE CONTROL

(71) Applicant: Ford Global Technologies, LLC, Dearborn, MI (US)

(72) Inventors: Adam Nathan Banker, Plymouth, MI (US); Julia Helen Buckland, Commerce Township, MI (US); Joseph Norman Ulrey, Dearborn, MI (US); Uros Vojko Kalabic, Ypsilanti, MI (US); Matthew John Gerhart, Dearborn Heights, MI (US); Tobias John Pallett, Farmington, MI (US); Ilya Kolmanovsky, Novi, MI (US); Suzanne Kay Wait, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 13/965,917

(22) Filed: Aug. 13, 2013

(65) Prior Publication Data

US 2015/0051762 A1    Feb. 19, 2015

(51) Int. Cl.
*B60L 9/00* (2006.01)
*B60L 11/00* (2006.01)
(Continued)

(52) U.S. Cl.
CPC .............. *B60W 20/1088* (2013.01); *B60K 6/48* (2013.01); *B60W 10/06* (2013.01); *B60W 10/08* (2013.01);
(Continued)

(58) Field of Classification Search
CPC . B60W 50/0097; B60W 20/10; B60W 20/50; B60W 10/08; F02D 2250/21; F02D 19/084; F02D 41/222; F02D 2710/0666; F02D 10/023; F02D 20/50; F02D 10/10; F02D 10/04; F02D 30/19; F02D 10/30; F02D 10/11; B60K 2350/1092; B60K 6/20; B60K 25/02; B60K 1/02; B60K 31/18; B60K 6/26; B60K 6/22; B60K 37/02
USPC ............... 701/22, 31.4, 33.8, 2, 105, 113, 36, 701/32.8, 110; 180/65.265, 197, 305, 307, 180/367
See application file for complete search history.

(56) References Cited

U.S. PATENT DOCUMENTS 3,614,259 A    10/1971    Neff
4,351,154 A    9/1982    Richter
(Continued)

FOREIGN PATENT DOCUMENTS

EP    0435357 A1    7/1991
EP    2317111 A1    5/2001
(Continued)

OTHER PUBLICATIONS

Ulrey, Joseph Norman et al., "Methods and Systems for Boost Control," U.S. Appl. No. 13/965,901, filed Aug. 13, 2013, 54 pages.
(Continued)

*Primary Examiner* — Calvin Cheung
*Assistant Examiner* — Luis A Martinez Borrero
(74) *Attorney, Agent, or Firm* — Julia Voutyras; Alleman Hall McCoy Russell & Tuttle LLP

(57) ABSTRACT

Methods and systems are provided for improving surge control. When surge conditions are approached, a reference governor reduces engine airflow at a slower rate and to a higher level than the engine airflow required to meet the reduced torque demand. The excess torque resulting from the extra airflow is offset by applying a negative torque on the driveshaft via an electric machine coupled to the engine or via alternate engine actuator adjustments.

24 Claims, 6 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 20/00* (2006.01)
  *B60W 10/06* (2006.01)
  *B60W 10/08* (2006.01)
  *B60K 6/48* (2007.10)

(52) U.S. Cl.
  CPC ....... *B60W 20/00* (2013.01); *B60W 2510/0628* (2013.01); *B60W 2510/082* (2013.01); *B60W 2510/083* (2013.01); *Y10S 903/93* (2013.01)

(56) References Cited

U.S. PATENT DOCUMENTS

| | | | |
|---|---|---|---|
| 4,389,845 | A | 6/1983 | Koike |
| 4,443,153 | A | 4/1984 | Dibelius |
| 4,544,326 | A | 10/1985 | Nishiguchi et al. |
| 4,817,387 | A * | 4/1989 | Lashbrook ............... 60/611 |
| 4,949,276 | A | 8/1990 | Staroselsky et al. |
| 6,029,452 | A * | 2/2000 | Halimi et al. ............ 60/612 |
| 6,079,210 | A | 6/2000 | Pintauro et al. |
| 6,089,019 | A * | 7/2000 | Roby et al. ............... 60/605.2 |
| 6,141,965 | A * | 11/2000 | Woollenweber et al. ........ 60/612 |
| 6,298,718 | B1 * | 10/2001 | Wang ..................... 73/114.01 |
| 6,408,833 | B1 | 6/2002 | Faletti |
| 6,565,479 | B2 | 5/2003 | Fattic et al. |
| 6,681,171 | B2 | 1/2004 | Rimnac et al. |
| 6,701,710 | B1 * | 3/2004 | Ahrens et al. ............ 60/605.2 |
| 6,725,847 | B2 | 4/2004 | Brunemann et al. |
| 6,983,596 | B2 | 1/2006 | Frankenstein et al. |
| 7,080,511 | B1 * | 7/2006 | Bolton et al. ............ 60/611 |
| 7,137,253 | B2 | 11/2006 | Furman et al. |
| 7,159,568 | B1 * | 1/2007 | Lewis et al. ............. 123/431 |
| 7,163,005 | B2 | 1/2007 | Tussing et al. |
| 7,640,744 | B2 | 1/2010 | Rollinger et al. |
| 7,775,043 | B2 * | 8/2010 | Funke et al. ............ 60/602 |
| 8,161,744 | B2 * | 4/2012 | Winsor et al. ........... 60/605.1 |
| 8,161,746 | B2 | 4/2012 | Ulrey et al. |
| 8,186,157 | B2 * | 5/2012 | Walmsley et al. .......... 60/600 |
| 8,267,069 | B2 | 9/2012 | Hsia et al. |
| 8,286,616 | B2 | 10/2012 | Clarke et al. |
| 8,287,233 | B2 | 10/2012 | Chen |
| 8,312,718 | B2 * | 11/2012 | Sun et al. ............... 60/602 |
| 8,333,071 | B2 | 12/2012 | Oakley et al. |
| 8,443,588 | B2 * | 5/2013 | Nishikiori et al. ......... 60/285 |
| 2006/0196182 | A1 | 9/2006 | Kimoto et al. |
| 2007/0119394 | A1 * | 5/2007 | Leone ................... 123/25 R |
| 2007/0119420 | A1 * | 5/2007 | Leone et al. ............. 123/431 |
| 2007/0119422 | A1 * | 5/2007 | Lewis et al. ............. 123/431 |
| 2007/0119425 | A1 * | 5/2007 | Lewis et al. ............. 123/478 |
| 2007/0151241 | A1 * | 7/2007 | Arnold ................... 60/605.1 |
| 2008/0060356 | A1 * | 3/2008 | Livshiz et al. ........... 60/605.1 |
| 2008/0163855 | A1 | 7/2008 | Matthews et al. |
| 2009/0071150 | A1 | 3/2009 | Joergl et al. |
| 2009/0218151 | A1 * | 9/2009 | Huber et al. ............. 180/65.265 |
| 2010/0250101 | A1 * | 9/2010 | Kawabe et al. ........... 701/104 |
| 2010/0280738 | A1 * | 11/2010 | Whitney et al. .......... 701/102 |
| 2010/0300088 | A1 * | 12/2010 | Joergl et al. ............ 60/602 |
| 2011/0023842 | A1 | 2/2011 | Kurtz |
| 2011/0041493 | A1 * | 2/2011 | Doering et al. ........... 60/603 |
| 2011/0094480 | A1 | 4/2011 | Suhocki et al. |
| 2011/0178691 | A1 * | 7/2011 | Wang et al. .............. 701/102 |
| 2012/0014812 | A1 | 1/2012 | Blaiklock et al. |
| 2012/0035793 | A1 * | 2/2012 | Kang et al. .............. 701/22 |
| 2012/0191321 | A1 * | 7/2012 | Ibuki et al. ............. 701/102 |
| 2012/0297765 | A1 | 11/2012 | Vigild et al. |
| 2013/0325234 | A1 * | 12/2013 | Shibata .................. 701/22 |

FOREIGN PATENT DOCUMENTS

| | | |
|---|---|---|
| EP | 1124047 A1 | 8/2001 |
| EP | 2426340 A1 | 3/2012 |
| EP | 2562397 A1 | 8/2012 |

OTHER PUBLICATIONS

Ulrey, Joseph Norman et al., "Methods and Systems for Condensation Control," U.S. Appl. No. 13/965,751, filed Aug. 13, 2013, 36 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

Jankovic Mrdjan J. et al., "Methods and Systems for Boost Control," U.S. Appl. No. 13/829,648, filed Mar. 14, 2013, 39 pages.

Styles, Daniel Joseph et al., "Methods and Systems for Boost Control," U.S. Appl. No. 13/965,698, filed Aug. 13, 2013, 43 pages.

Buckland Julia Helen et al., "Methods and Systems for Surge Control," U.S. Appl. No. 113/965,725, filed Aug. 13, 2013, 38 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/965,794, filed Aug. 13, 2013, 56 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/966,006, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Method and System for Fuel Vapor Management," U.S. Appl. No. 13/660,884, filed Oct. 25, 2012, 38 pages.

* cited by examiner

METHODS AND SYSTEMS FOR TORQUE CONTROL

FIELD

The present application relates to methods and systems for modifying driver air demand and engine torque output during turbocharger surge.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and potentially compressor surge. Surge can lead to NVH issues such as undesirable noise from the engine intake system.

One approach for controlling surge induced noise is shown by Ulrey et al. in U.S. Pat. No. 8,161,746. Therein, when compressor surge conditions are approached, one or most boost actuators are adjusted to control air flow through the compressor. Specifically, an engine intake throttle downstream of the compressor is closed, an additional intake throttle upstream of the compressor is closed, and a compressor bypass valve and wastegate are opened to dump excess boost pressure. By closing the compressor inlet throttle, surge induced noise is reduced.

However, the inventors herein have identified potential issues with such an approach. For example, the approach of Ulrey et al. uses throttle control coupled with a bypass valve to increase compressor flow (so as to address surge) without increasing engine flow. However, due to the delay in compressor bypass valve response, it may be difficult to accurately control the bypass and engine flows under all conditions, engine torque transients may be experienced. As another example, the approach of Ulrey et al. requires the inclusion of an additional throttle upstream of the compressor, and coordination of the upstream throttle with operation of the throttle downstream of the compressor. As such, this adds cost and complexity to the system.

In one example, some of the above issues may be at least partly addressed by a method for a boosted engine system including an electric machine (e.g., a motor). The method comprises, responsive to an indication of turbocharger surge, applying negative torque from an electric machine coupled to the engine while providing a greater than demanded airflow to the engine. In an alternate example, the method includes, responsive to an indication of turbocharger surge, providing a greater than demanded throttle flow to the engine while adjusting an alternate actuator to deliver engine demanded torque based on the greater than demanded throttle flow. For example, one or more of cam timing and spark ignition timing may be adjusted based on the greater than demanded throttle flow. In this way, throttle flow (and compressor airflow) can be modified to mitigate surge, while negative torque is used to meet driver demanded wheel torque while addressing NVH issues associated with the surge.

As an example, an engine system may include a turbocharger, with a compressor driven by a turbine, for providing a boosted intake aircharge. In response to a sudden drop in torque demand, such as during a tip-out, a compressor recirculation valve may be opened to dump boost pressure while a wastegate is opened to reduce turbine speed. In addition, an engine airflow may be reduced to meet the lower torque demand. The resulting reduction in throttle flow can bring the compressor ratio (or compressor flow) within or close to a surge limit. In response to surge being approached or exceeded, an engine controller may limit throttle flow reduction. Specifically, airflow may not be reduced to a level commensurate with the reduced torque demand. Rather, the reduction in airflow may be limited so that the airflow is controlled to a level that is greater than what is actually required to meet the torque demand. Fuel injection may be adjusted based on the airflow to maintain engine combustion at stoichiometry (or an alternate desired combustion air-fuel ratio). The excess torque resulting from the excess airflow may then be absorbed by an electric machine coupled to the engine. For example, where the engine is coupled in a hybrid electric vehicle system, a load from an electric motor may be applied on the engine to add negative torque to the driveshaft and meet the driver torque demand. In further examples, a starter-motor (such as a crank integrated starter generator), or an alternator coupled to the engine may be used to apply a load on the engine and absorb the excess torque. In each case, the amount of negative torque applied may be based on the difference between the operator expected torque (or torque demand) and the torque provided with the engine (while operating with elevated airflow). In one approach, the engine controller may use a reference governor to modify the airflow responsive to the indication of surge. For example, the reference governor may be configured so that the engine airflow is initially modified to reduce compressor surge and then over time, the airflow modification is transitioned to meet driver torque demand.

In an alternate example, while the greater than demanded throttle flow is provided, one or more alternate engine torque actuators may be adjusted to reduce the excess torque. For example, cam timing adjustments and/or spark timing adjustments may be concurrently used to compensate for the excess torque that would have been generated by the greater than demanded throttle flow. This may include, for example, retarding spark timing from MBT by an amount based on the greater than demanded airflow to reduce torque. As another example, intake and/or exhaust cam timing may be advanced or retarded (based on engine speed and breathing effects) by an amount based on the greater than demanded airflow to reduce torque.

In this way, by limiting throttle flow reduction response to a drop in torque and boost demand, a sudden change in flow rate and pressure at the compressor is reduced, lowering the likelihood of compressor surge. By moving compressor operation away from a surge limit, surge related issues are alleviated. By compensating for the excess torque by applying an electric machine load on the driveshaft, or adjusting cam and/or spark ignition timing, a "run-on" feel that is created by the raising of throttle flow to levels that are higher than actually desired, can be overcome. As such, this allows surge to be reduced without degrading the operator's drive feel and while meeting the operator torque demand. Overall, engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
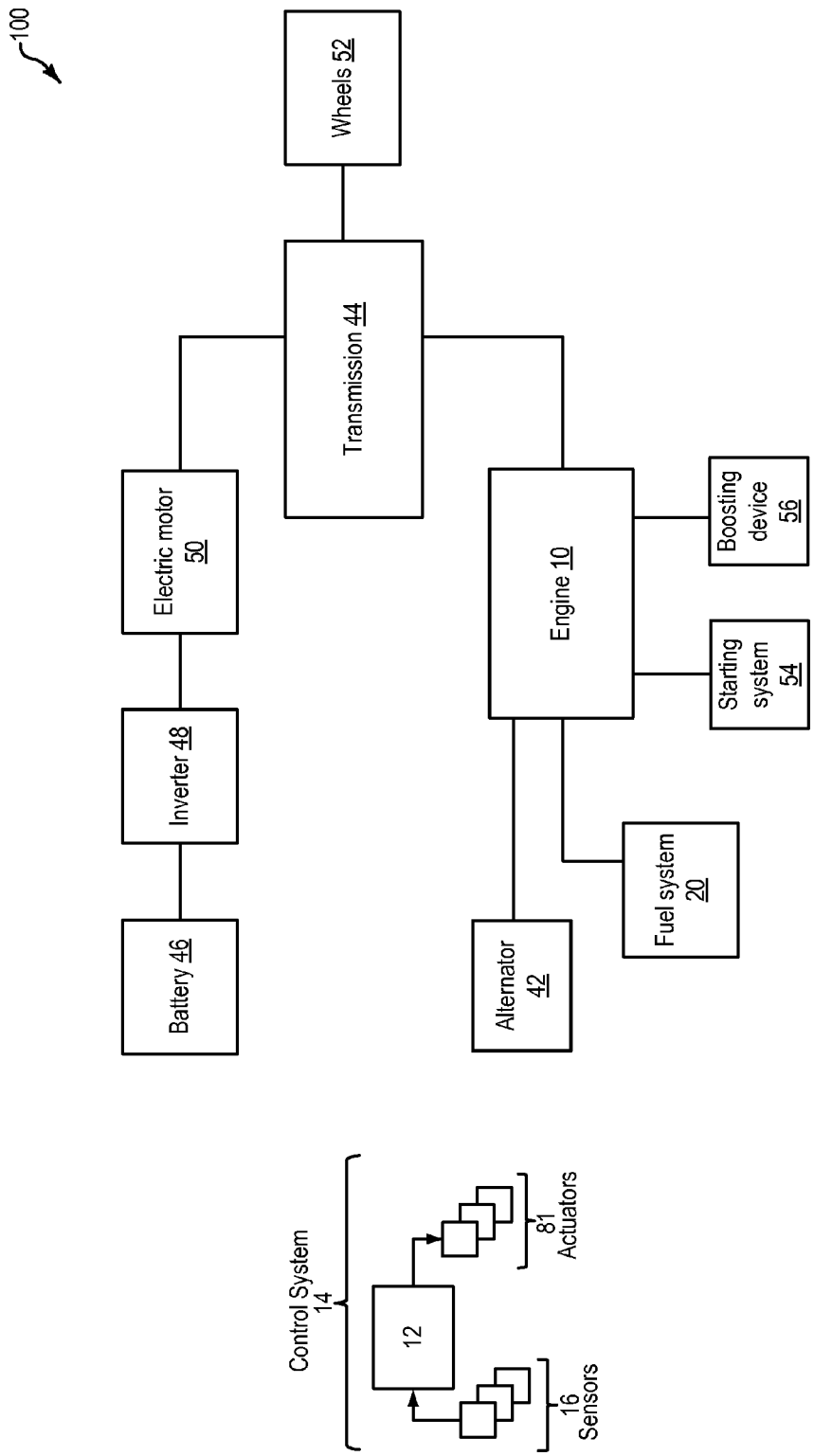
FIG. 1 shows a schematic depiction of a boosted engine system coupled in a hybrid electric vehicle system.

The following description relates to systems and methods for addressing compressor surge in a boosted engine system, such as the system of FIG. 1. Boost control actuators (FIG. 2) may be adjusted to modify compressor flow rate and pressure ratio in anticipation of surge while torque control actuators are concurrently adjusted to modify engine torque output (FIG. 6). A controller may be configured to perform a control routine, such as the routine of FIG. 3, to perform adjustments to the position of a wastegate, a compressor bypass valve, and an intake throttle to modify throttle flow as a compressor surge limit (FIG. 5) is reached. In particular, throttle flow may be reduced by a limited amount. The controller may also compensate for torque errors (in particular, excess torque) arising from the modified throttle flow by applying negative torque from an electric machine of the engine system and/or by adjusting one or more alternate engine torque actuators (such as cam timing and valve timing). An example adjustment is shown with reference to FIG. 4. In this way, throttle flow is reduced to address surge and surge related NVH issues while torque adjustments are used to address operator drive feel issues.

FIG. 1 depicts a hybrid propulsion system 100 for a vehicle. In the depicted embodiment, the vehicle is a hybrid electric vehicle (HEV). Hybrid propulsion system 100 includes an internal combustion engine 10. Engine 10 is coupled to transmission 44. Transmission 44 may be a manual transmission, automatic transmission, or combinations thereof. Transmission 44 may include a gear set having a plurality of gears. Further, various additional components may be included, such as a torque converter, a final drive unit, etc. Transmission 44 is shown coupled to drive wheels 52, which may contact a road surface.

Transmission 44 may alternatively be driven by an electric motor 50. In the depicted embodiment, the motor is a battery-powered electric motor wherein electric motor 50 is powered by energy stored in battery 46. Other energy storage devices that may be used to power motor 50 include a capacitor, a flywheel, a pressure vessel, etc. An energy conversion device, herein inverter 48, may be configured to convert the DC output of battery 46 into an AC output for use by electric motor 50. Electric motor 50 may also be operated in a regenerative mode, that is, as a generator, to absorb energy from vehicle motion and/or the engine and convert the absorbed energy to an energy form suitable for storage in battery 46. When operated in the regenerative mode, electric motor 50 may apply a load on the engine, thereby providing a negative torque on the driveline. Furthermore, electric motor 50 may be operated as a motor or generator, as required, to augment or absorb torque.

In some embodiments, as depicted, engine 10 may be a boosted engine coupled to a boosting device 56 for providing a boosted aircharge to the engine. In one example, as elaborated with reference to FIG. 2, boosting device 56 may be a turbocharger including an exhaust turbine coupled to an intake compressor along a shaft. Therein, flow of exhaust gas through the turbine may spin the turbine, which then drives the compressor. The compressor may then compress intake air before delivering boosted air to the engine. In other examples, the boosting device may be a supercharger wherein an intake compressor is driven by an electric motor or the engine crankshaft. By using boosted air, engine performance and peak power outputs can be improved.

Engine 10 may be started with an engine starting system 54, including a starter motor. In one example, the starter motor coupled to the engine may be battery-operated, wherein the starter motor is driven by energy from battery 46. In another example, the starter motor may be a crank integrated starter generator (CISG). In yet another example, the starter motor may be a belt-driven integrated starter generator (BISG). In still another example, the starter may be a powertrain drive motor, such as a hybrid power-plant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating the starter motor of starting system 54, the engine 10 may be spun and cranked.

Hybrid propulsion system 100 may be operated in various embodiments including a full hybrid system, wherein the vehicle is driven by only the engine, only the electric motor, or a combination of both. Alternatively, assist or mild hybrid embodiments may also be employed, wherein the engine is the primary source of torque, and the electric motor selectively adding torque during specific conditions, such as during a tip-in event. Accordingly, hybrid propulsion system 100 may be operated in various modes of operation. For example, during an "engine-on" mode, engine 10 may be operated and used as the primary source of torque for powering wheels 52. During the "engine-on" mode, fuel may be supplied to engine 10 from fuel system 20 including a fuel tank. The fuel tank may hold a plurality of fuels, such as gasoline, or fuel blends, such as fuel with a range of alcohol (e.g., ethanol) concentrations including E10, E85, etc., and combinations thereof. In another example, during an "engine-off" mode, electric motor 50 may be operated to power the wheels. The "engine-off" mode may be employed during braking, low speeds, while stopped at traffic lights, etc. In still another example, during an "assist" mode, an alternate torque source may supplement and act in cooperation with the torque provided by engine 10.

Vehicle system components outside of the drivetrain may include an alternator 42. Alternator 42 may be configured to convert the mechanical energy generated while running engine 10 to electrical energy for storage in an energy storage device, such as in battery 46. Alternator 42 may include an alternator clutch (not shown). As such, when the alternator clutch is engaged, torque output from the running engine may be relayed to alternator 42 along an alternator input shaft (not shown). However, as further elaborated herein, under certain conditions, for example when the engine is generating more torque than is required, an engine controller may be configured to selectively engage (e.g., at least partially engage) the alternator clutch and apply an alternator load on the engine. By relaying the accessory torque generated in alternator 42 on engine 10, a negative torque is applied on the driveline.

Hybrid propulsion system 100 may further include control system 14. Control system 14 is shown receiving information from a plurality of sensors 16 (various examples of which are described at FIG. 2) and sending control signals to a plurality of actuators 81 (various examples of which are described at FIG. 2). As one example, sensors 16 may include various pressure and temperature sensors, a fuel level sensor, various exhaust gas sensors, torque sensors, etc. The control system may also send control signals to the actuators 81 based on input received from a vehicle operator and the plurality of sensors 16. The various actuators may include, for example, the transmission, transmission gears, cylinder fuel injectors, an air intake throttle coupled to the engine intake manifold, etc. The control system 14 may include a controller 12. The controller may receive input data from the various sensors or buttons, process the input data, and trigger the actuators in response to the processed input data based on instruction or code programmed therein corresponding to one or more routines. An example control routine is described herein with regard to FIG. 3.

Figure 2:
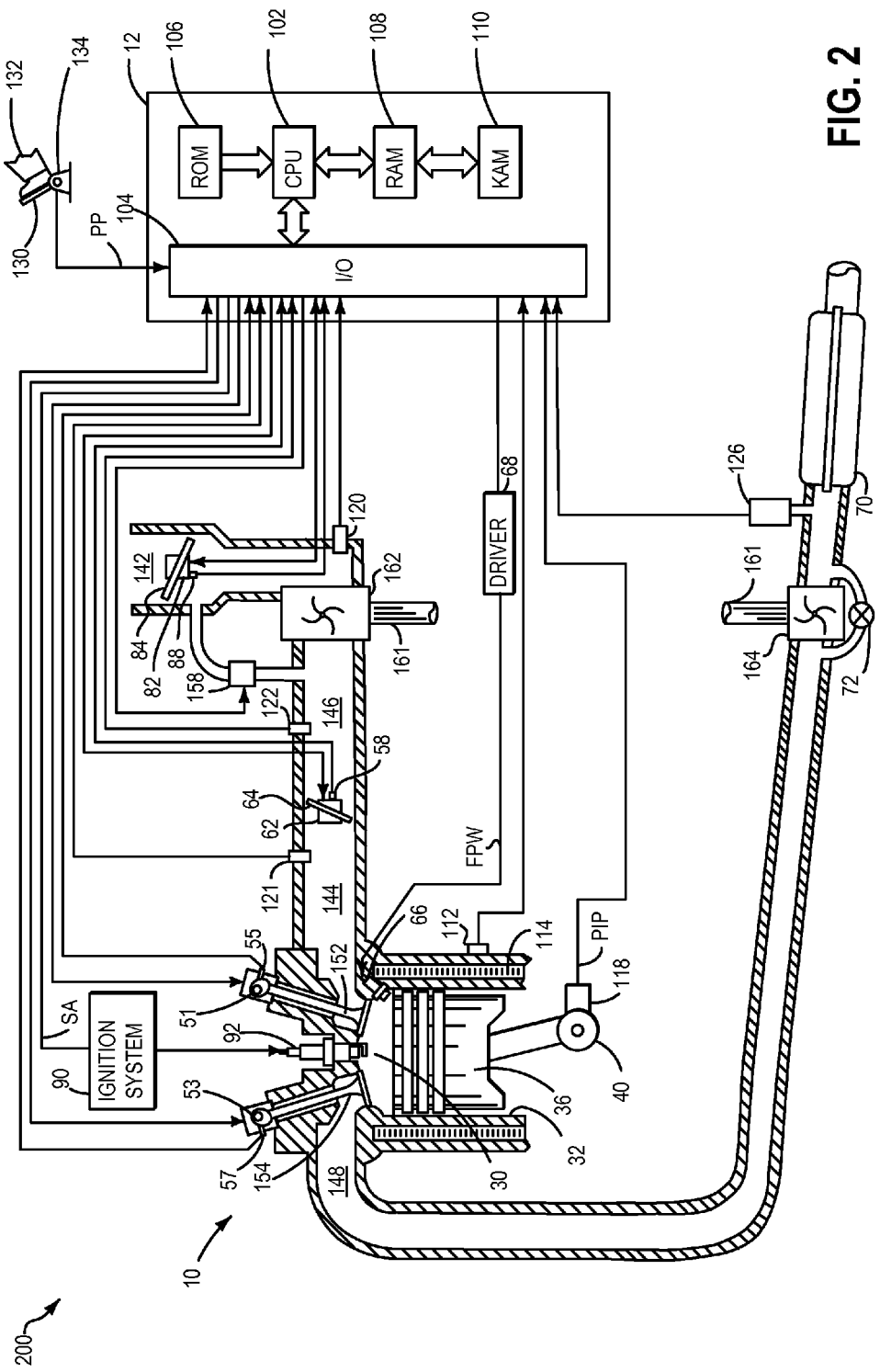
FIG. 2 shows an example combustion chamber of the boosted engine system.

As such, engine 10 comprises a plurality of cylinders. Referring to FIG. 2, one cylinder or combustion chamber is described in detail at map 200. The various components of engine 10 may be controlled by electronic engine controller 12. Engine 10 includes combustion chamber 30 and cylinder walls 32 with piston 36 positioned therein and connected to crankshaft 40. Combustion chamber 30 is shown communicating with intake manifold 144 and exhaust manifold 148 via respective intake valve 152 and exhaust valve 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (such as fuel system 20 of FIG. 1) including a fuel tank, fuel pump, and fuel rail. Fuel injector 66 is supplied operating current from driver 68 which responds to controller 12. In addition, intake manifold 144 is shown communicating with optional electronic throttle 62 which adjusts a position of throttle plate 64 to control airflow to engine cylinder 30. This may include controlling airflow of boosted air from intake boost chamber 146. A single air intake system throttle (AIS throttle) 82 is coupled to air intake passage 142 and located upstream of the boost chamber 146.

In some embodiments, engine 10 is configured to provide exhaust gas recirculation, or EGR. When included, EGR is provided via an EGR passage and EGR valve to the engine air intake system at a position downstream of air intake system (AIS) throttle 82 from a location in the exhaust system downstream of turbine 164 for low pressure EGR. Alternatively, EGR may be drawn from upstream of the turbine and delivered to downstream of the compressor for high pressure EGR. EGR may be drawn from the exhaust system to the intake air system when AIS throttle 82 is partially closed. Throttle plate 84 controls air pressure at inlet of compressor 162. The AIS may be electrically controlled and its position may be adjusted based on optional position sensor 88.

Compressor 162 draws air from air intake passage 142 to supply boost chamber 146. In some examples, air intake passage 142 may include an air box (not shown) with a filter. Exhaust gases spin turbine 164 which is coupled to compressor 162 via shaft 161. A vacuum operated wastegate actuator 72 allows exhaust gases to bypass turbine 164 so that boost pressure can be controlled under varying operating conditions. In alternate embodiments, the wastegate actuator may be pressure or electrically actuated. Wastegate 72 may be closed (or opening may be decreased) in response to increased boost demand, such as during an operator pedal tip-in. By closing the wastegate, exhaust pressures upstream of the turbine can be increased, raising turbine speed and peak power output. This allows boost pressure to be raised. In another example, wastegate 72 may be opened (or opening may be increased) in response to decreased boost demand, such as during an operator pedal tip-out. By opening the wastegate, exhaust pressures can be reduced, reducing turbine speed and power. This allows boost pressure to be lowered.

Compressor recirculation valve 158 (CRV) provides a path around compressor 162 so that air may move from the compressor outlet to the compressor inlet so as to reduce a pressure that may develop across compressor 162. CRV 158 may be opened and closed via an electric signal from controller 12. In some embodiments, CRV 158 may be adjustable to one of a fully open or a fully closed position. In other embodiments, CRV 158 may be configured like a throttle such that its position is variable to any position between a fully open and a fully closed position. By actuating CRV 158 (alone or in coordination with wastegate 72), a boost pressure can be rapidly controlled. For example, CRV 158 may be closed (or opening may be decreased) in response to increased boost demand, such as during an operator pedal tip-in. By closing the CRV, a larger proportion of boosted aircharge is delivered to the engine intake manifold, raising turbine engine peak power output. This allows boost levels to be raised. In another example, CRV 158 may be opened (or opening may be increased) in response to decreased boost demand, such as during an operator pedal tip-out. By opening the CRV, boost pressure can be dumped upstream of the compressor, reducing boost pressure and boost levels. In addition, by opening CRV, compressor surge can be reduced. For example, when an operator tips-out of an accelerator pedal, and AIS throttle 82 closes to reduce airflow, an increased pressure differential can be created across the compressor. This leads to reduced forward flow through the compressor (compressor surge), degrading turbocharger performance. Herein, by opening CRV 158, the pressure differential across the compressor is reduced, moving the compressor ratio (or compressor flow) away from a surge limit or surge region.

Figure 5:
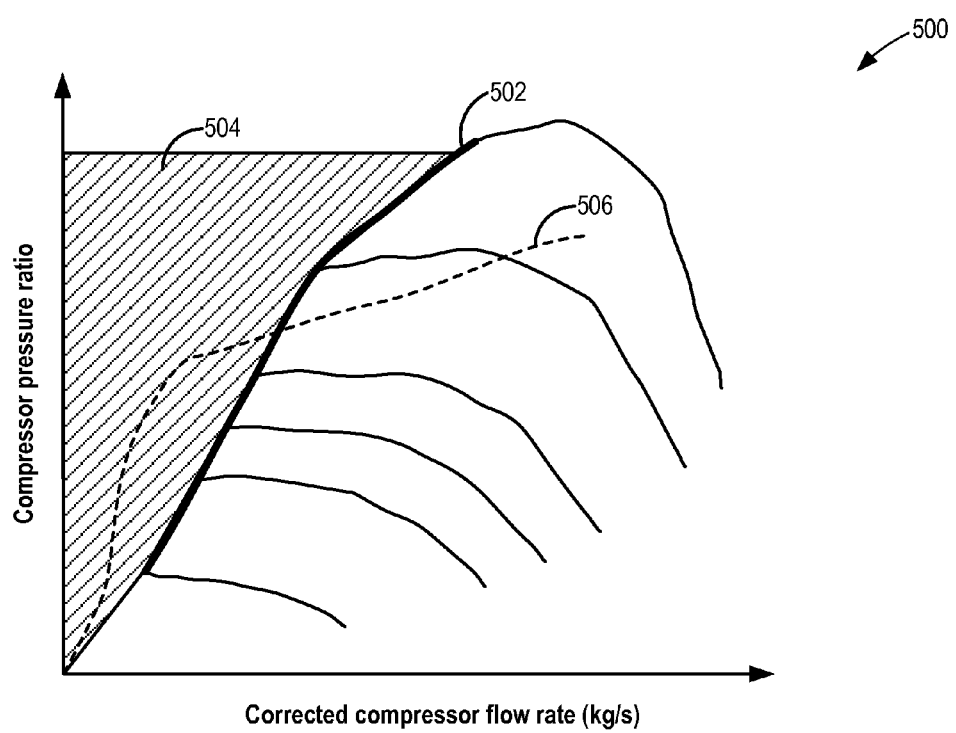
FIG. 5 shows a compressor map displaying a compressor surge limit.
Figure 6:
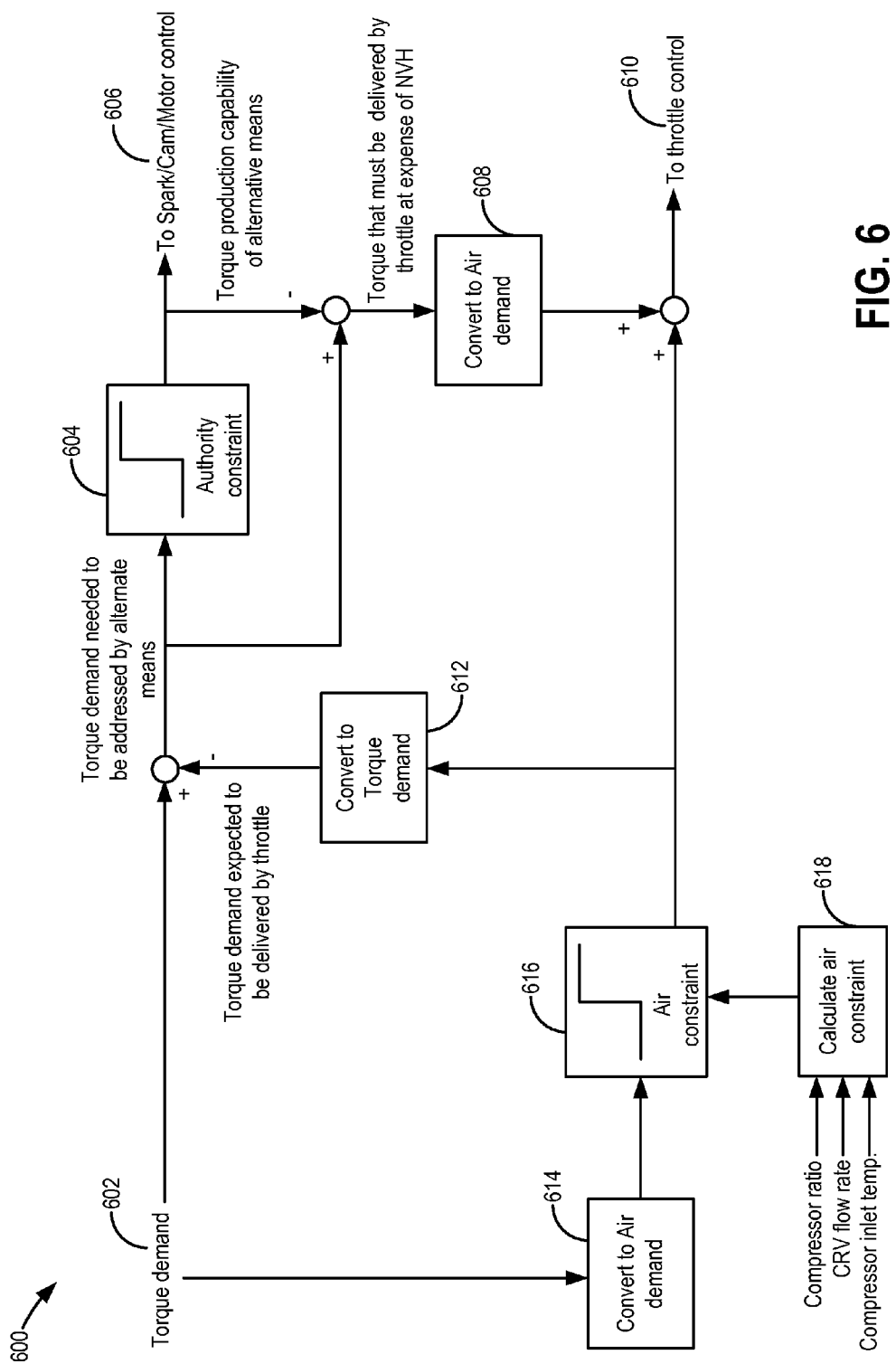
FIG. 6 shows an example block diagram for adjusting driver air demand and using torque compensations to address compressor surge.

A controller may use a map, such as the map of FIG. 5, to identify whether the compressor is operating in or around a surge region. In particular, map 500 of FIG. 5 shows a change in compressor pressure ratio (along the y-axis) at different compressor flow rates (along the x-axis). Line 502 shows a surge line (or surge limit) for the given operating conditions. Compressor operation to the left of surge line 502 results in operation in a hard surge region 504 (depicted as shaded region 504). Compressor operation in hard surge region 504 results in objectionable NVH and potential degradation of engine performance.

Dashed line 506 depicts how compressor surge can occur during a tip-out. In particular, during a tip-out, when the throttle is rapidly closed to meet driver torque demand, flow through the compressor can decrease very quickly, while compressor exit pressure decreases relatively slowly. This forces compressor operation to the left of surge line 502 and into hard surge region 504. When operating in this region, CRV 158 may be opened so as to move compressor operation away from both the surge line and the hard surge region (for example, into a soft surge region to the right of surge line 502) where NVH is less objectionable.

Returning to FIG. 2, distributorless ignition system 90 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position (PP) adjusted by a foot 132 of a vehicle operator; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle, such as shown in FIG. 1. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is described merely as an example, and that intake and exhaust valve opening and/or closing timings may vary, such as to provide positive or negative valve overlap, late intake valve closing, or various other examples.

As such, during cylinder combustion, an amount of air delivered to the cylinders may be adjusted based on the operator torque demand with the amount of air delivered increased as the torque demand increases. An amount of fuel injected into the cylinders may then be adjusted based on the airflow to maintain a combustion air-fuel ratio at or around stoichiometry or an alternate desired air-fuel ratio. However, as elaborated below, during selected conditions, the controller may deliver more air to the cylinders than required. For example, in response to a tip-out, instead of lowering engine airflow to a relatively lower level to meet a reduced torque demand, engine airflow may be decreased less to a relatively higher level (than the level required to meet the reduced torque demand). When fuel injection is adjusted to maintain stoichiometric combustion, the result is excess engine torque and a "run-on" drive feel experienced by the vehicle operator. By limiting the reduction of airflow, however, compressor surge is reduced. This alleviates surge related performance and NVH issues. To address the run-on feel, while decreasing the airflow, the controller may concurrently increase a negative torque applied on the driveline via one or more electric machines of the vehicle system (such as the alternator, the starter-motor, and the electric motor). By increasing the negative torque while limiting the reduction of airflow, the excess torque can be absorbed and the drive feel can be improved. Alternatively, the controller may concurrently adjust one or more (alternate) engine torque actuators, such as a spark ignition timing, to decrease the engine output torque. For example, spark timing may be retarded from MBT by an amount to compensate for the excess engine torque resulting from the airflow adjustment. As another example, intake and/or exhaust cam timing may be adjusted (e.g., advanced or retarded) based on engine speed to achieve the trapped charge required to produce the desired engine torque. This is in response to a controller request for more air through the throttle than needed by the engine so as to avoid compressor surge.

FIG. 6 depicts an example block diagram 600 of a control algorithm that may be used by the controller to meet driver torque demand while addressing compressor surge and related NVH constraints.

At block 602, a torque demand is received from the operator, for example, based on a pedal position. This torque demand is converted to a corresponding air demand at block 614. Specifically, an amount of air required to provide the torque demand is determined. The air demand is then adjusted at block 616 based on air constraints. The air constraint may be calculated at block 618 based on factors such as compressor ratio, CRV flow rate, and compressor inlet temperature. For example, based on modeled data, it may be determined if the air demand requested at 614 is likely to affect the CRV flow rate such that the compressor ratio is moved towards a surge region. In one example, based on a drop in torque demand, a corresponding drop in air demand (e.g., a desired closing of the throttle) may be determined. However, based on the air constraint, it may be determined that the desired drop in air demand can lead to compressor surge. For example, the desired throttle closing rate can lead to decreased compressor flow rate and a shift of the compressor ratio to the left of the surge line on a compressor map (such as line 502 of FIG. 5). Accordingly, the air demand may be limited (e.g., throttle closure may be constrained).

The adjusted air demand is converted back to an adjusted torque demand at block 612. The initial torque demand and the airflow limited torque demand are then compared to calculate a torque demand delta that needs to be addressed by alternate means than airflow (e.g., via spark, cam, and/or electric machine adjustments). With reference to the above example, the limited air demand is converted to a corresponding torque demand and compared to the initial torque demand. Herein, as a result of limiting the throttle closing, more torque may be expected to be delivered by the throttle than demanded. The difference between the two, that is the excess torque in this example, is the torque demand needed to be addressed by alternative means (e.g., other torque actuators).

The torque demand to be addressed by alternative means is then adjusted based on an authority constraint. In particular, it may be determined if one or more other engine actuators have sufficient authority to meet the requested decreased in torque demand. In one example, where the actuator is spark timing, it may be determined if spark can be retarded (e.g., from MBT) to reduce torque. There are combustion stability limitations on how far we can retard spark that may limit the amount of engine torque reduction that we can attain via the spark actuator. In another example, where the actuator is cam timing, it may be determined if intake or exhaust cam timing adjustments are limited. In one example, it may be possible to adjust cam timing to delay intake valve opening from TDC and/or delay intake valve closing from BDC to reduce torque. However, if any of the cams are already at a position limit, further adjustments may not be possible. In still another example, it may be determined if adjustments to an electric machine of the vehicle system are possible, such as based on a battery state of charge.

The torque demand modified based on the authority constraint is then used to perform spark/cam/motor control, as elaborated below with reference to FIG. 3. This value reflects the torque production capability of the alternative means. The torque produced by the alternative means (based on actuator authority and constraints) is then compared to the torque demand to be addressed by alternative means (due to air constraints). Any remaining torque then qualifies as torque that must be delivered by the throttle at the expense of NVH. As such, it is desired to adjust the various torque actuators so that this difference is zero, or minimal, so that throttle constraints can be used to reduce surge while alternate torque actuator adjustments are used to address driver torque demand. However, if sufficient authority is not available from the other actuators, the throttle has to be used to meet the residual torque demand, regardless of NVH constraints. Thus, at block 608, this residual torque demand that has to be met by the throttle is converted back to an air demand. Then, the modified air demand calculated at block 616 is combined with the air demand determined at block 608 to calculate a revised throttle position to be used for throttle control. For example, if the actuators are not constrained and are capable of addressing the excess torque, the throttle closing required in response to the drop in torque demand can be constrained more (to reduce surge). However, if the actuators are constrained and are not capable of fully addressing the excess torque, the throttle closing required in response to the drop in torque demand is constrained less and some NVH (due to compressor surge) is tolerated.

Various permutations of the control approach of FIG. 6 are possible. For example, all calculations could be done in the torque or air domains before distribution to actuators. Also, the various signals can be ramped in and out, limited, etc., to meet driveability and torque monitor requirements. Additionally some trade-off can be made between NVH (turbo surge) and excess torque delivery (i.e. slower decay in torque relative to driver demand and/or a maximum steady state over-torque delivery limit). Further, as elaborated herein with reference to FIG. 3, the controller may also use a reference governor to provide the desired air and torque control.

Figure 3:
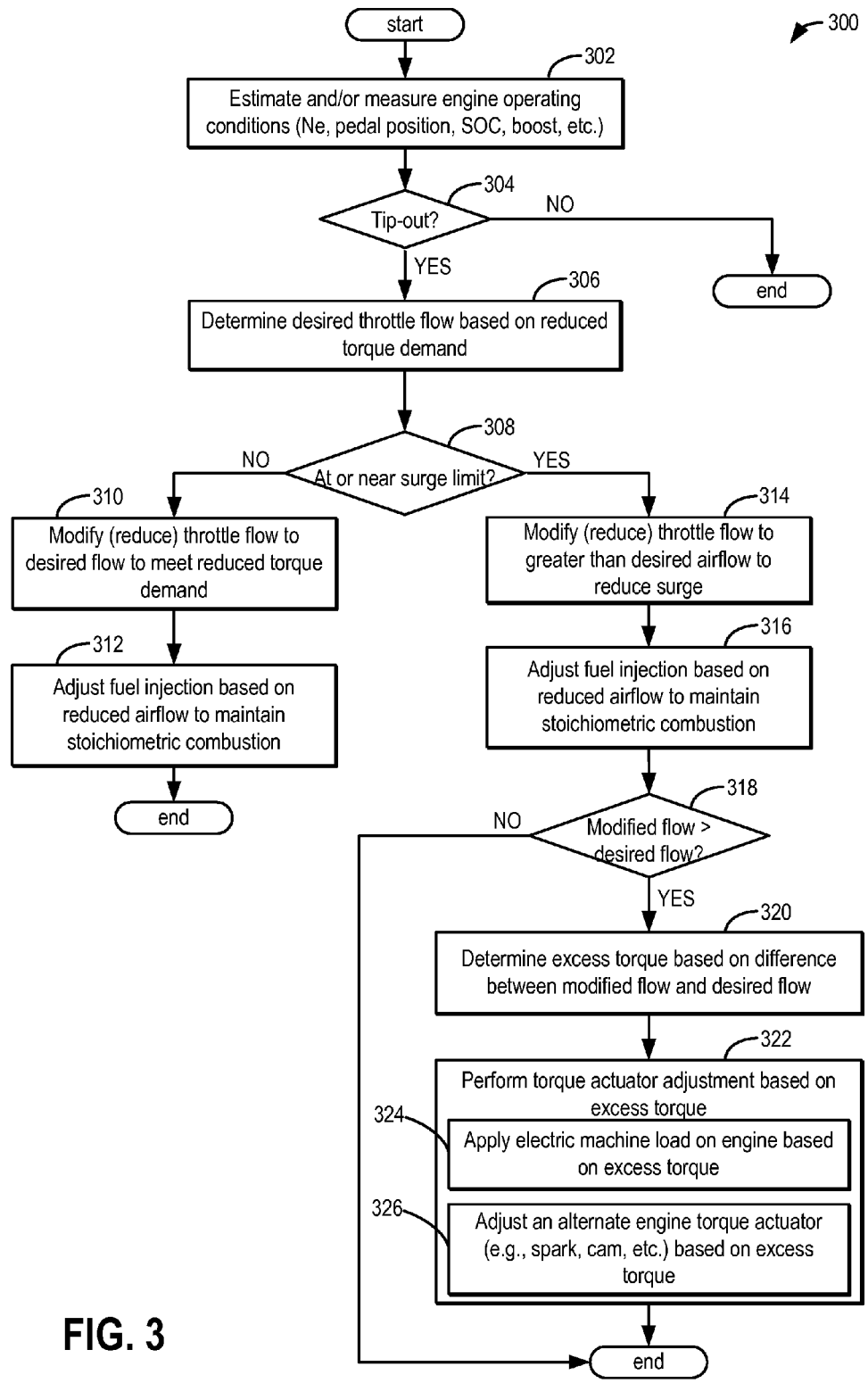
FIG. 3 shows a high level flow chart illustrating a routine that may be implemented for reducing driver air demand and using torque compensations to address compressor surge.

Now turning to FIG. 3, an example routine 300 is shown for addressing compressor surge by reducing driver air demand at a limited rate and using torque compensations from one or more electric machine to improve drive feel.

At 302, the routine includes estimating and/or measuring engine and vehicle operating conditions. These include, for example, engine speed, pedal position, boost level, torque demand, BP, MAP, battery state of charge (SOC), engine coolant temperature, exhaust catalyst temperature, turbine speed, etc.

At 304, a tip-out event may be confirmed. For example, a tip-out may be confirmed in response to an accelerator pedal being released by the vehicle operator. If a tip-out is not confirmed, the routine may end. In particular, the engine control system may continue operating the engine with airflow adjusted based on torque demand, and fuel injection adjusted based on airflow to enable combustion at an air-fuel ratio based on the operating conditions, for example, stoichiometric combustion (or an alternate desired combustion air-to-fuel ratio, such as richer than stoichiometry or leaner than stoichiometry).

It will be appreciated that while the compressor surge addressing routine of FIG. 3 confirms a tip-out at 304, in alternate embodiments, the compressor surge routine may be initiated in response to the intake throttle being closed relatively quickly. For example, at 304, it may be determined if engine air demand has been reduced for a transmission shift, to enable traction control, etc.

As such, the tip-out may indicate a sudden drop in torque and boost demand. At 306, the routine includes determining a desired engine intake airflow based on the reduced torque demand. For example, as the torque demand drops, a smaller airflow to the engine may be desired to provide the desired torque. In addition to the desired intake airflow, a throttle setting (e.g., a throttle opening) associated with the desired intake airflow may be determined. In one example, the desired engine airflow may be an initial (or first) airflow amount.

In one example, the controller may determine nominal boost actuator settings, such as settings for one or more of a wastegate coupled to an exhaust turbine of the turbocharger and a compressor recirculation valve (CRV) coupled to an intake compressor of the turbocharger to control boost based on the torque demand. This may include, for example, increasing an opening of the CRV and/or the wastegate. In one example, increasing an opening includes shifting the CRV and/or the wastegate to a fully open position. By increasing an opening of the wastegate, exhaust pressure upstream of the turbine is reduced, reducing turbine speed and peak power. Likewise, by increasing an opening of the CRV, boost pressure from downstream of the compressor can be dumped to upstream of the compressor. This not only reduces boost pressure delivered to the engine intake but also reduces the pressure ratio across the compressor, moving the compressor away from a surge condition. While the example list boost actuator adjustments responsive to boost pressure only, it will be appreciated that the boost actuators may be adjusted based on various additional inputs other than the boost pressure. For example, as discussed below, wastegate and CRV adjustments may also be performed in response to an indication or detection of surge.

As such, even with CRV and wastegate adjustments, turbocharger surge conditions may persist. For example, due to a delay between the wastegate adjustment and the effect of the adjustment on boost pressure (due to slow turbocharger dynamics), the engine may be operating at or near a surge limit. At 308, it may be confirmed if the engine is at or near the surge limit. That is, it may be determined if there is an indication of surge. The indication of surge may include, for example, a likelihood of turbocharger surge before an actual occurrence of surge. Alternatively, the indication of surge may include an actual occurrence of surge. Therein, it may be determined if the compressor is operating within a soft surge region, or at (or beyond) a hard surge limit.

If the compressor is not at or near the surge limit (that is, there is no indication of surge), then at 310, the routine includes modifying the engine airflow to the desired or demanded airflow to meet the reduced torque demand. Specifically, the airflow to the engine may be reduced to the initial, or first, airflow amount that corresponds to an amount of air required to provide the desired (reduced) torque. The engine airflow may be reduced to the initial airflow amount at a faster rate so that the reduced torque level is attained quickly. For example, the air intake throttle may be quickly closed (or the opening may be quickly decreased) so as to reduce the airflow amount rapidly, thereby lowering the engine torque output to the desired level. Additional wastegate and CRV adjustments may also be performed concomitantly. At 312, fuel injection to the engine may be reduced based on the reduced airflow to maintain stoichiometric combustion. For example, fuel injection may be adjusted based on the initial airflow amount so that the engine may be operated at stoichiometry with an airflow amount based on the demanded torque. It will be appreciated that, in alternate embodiments, an alternate air-fuel ratio (AFR) may be required (e.g., rich or lean AFR) based on the engine operating conditions and the controller may adjust the fuel injection based on the initial airflow amount to provide the desired combustion AFR. For example, the fuel injection may be adjusted to operate the engine leaner than stoichiometry for emissions purposes. In addition to fuel injection adjustments, spark timing adjustments may also be performed based on the amount of airflow.

If the compressor is at or near the surge limit (that is, there is an indication of surge), then at 314, the routine includes modifying the engine airflow to a greater than demanded or desired airflow to reduce surge. For example, the controller may use a control algorithm, such as discussed at FIG. 6, to modify the engine airflow based on air constraints and torque actuator authority constraints. Specifically, the controller may modify the airflow to be higher than the initial or first airflow amount so as to provide a greater than demanded airflow to the engine. Therein, a throttle opening may be adjusted so that airflow is reduced to a second airflow amount that is greater than the first airflow amount required to meet the (reduced) torque demand, while combusting the engine at stoichiometry (or other nominal AFR based on operating conditions). Further, the engine airflow may be reduced at a slower rate to the second airflow amount so that the reduced torque level is attained slowly. For example, the air intake throttle may be closed slowly (or an opening may be decreased slowly) so as to reduce the airflow amount slowly, thereby providing more engine torque output than demanded. The greater than demanded airflow (that is, the second airflow amount) may be based on a surge limit of the turbocharger. An extent of increasing airflow above the initial (or first) airflow amount may be based on a surge limit of the compressor, the airflow increased further above the initial airflow amount as the compressor ratio (or compressor flow) approaches or exceeds the surge limit. In other words, as the surge limit is approached or exceeded, the second airflow amount provided may be raised further above the desired first airflow amount. By limiting reduction of airflow responsive to the tip-out, the pressure differential across the compressor can be reduced, and compressor flow can be increased, thereby moving the compressor further away from hard and soft surge limits.

In one example, the engine control system may include a reference governor that is configured to predict surge and modify the driver air demand accordingly. For example, in response to a tip-out, the reference governor may determine how to reduce the airflow including whether to limit the airflow reduction, what level to reduce the airflow to, and at what rate. The reference governor may be configured to operator through update equation (1):

$$v(t)=v(t-1)+k(t)(r(t)-v(t-1)) \qquad (1)$$

where r(t) is the driver air demand and v(t) is the modified air demand and v(t−1) is the previous modified air demand. k(t) may be calculated by way of either a convex minimization algorithm or through the solution of a set of scalar divisions. Specifically, k(t) may be defined as the maximum value in [0, 1] such that the modified demand, v(t), is not predicted to cause surge. It may do this by taking the current state estimate and solving for k(t) based on a future prediction of the state. The reference governor may update the state estimate at each sampling point and recalculate the allowable air demand. As such, when k(t)=1, then v(t)=r(t), and the airflow will not cause surge according to the reference governor.

In an alternate embodiment, the reference governor may be configured to make a trade-off between torque delivery and surge wherein the governor favors surge prevention initially and transitions over time to meet driver demand.

Next, at 316, as at 312, the routine includes adjusting fuel injection to the engine based on the reduced airflow to maintain stoichiometric combustion. For example, as the engine airflow is reduced, the fuel injection may be reduced. However, since the reduction of airflow is limited at 314, the fuel injection amount delivered at 314 may be more than the fuel injection amount delivered at 312. It will be appreciated that while the routine suggests adjusting the fuel injection based on the modified airflow to maintain stoichiometric combustion, in alternate embodiments, based on nominal operating conditions, an alternate air-fuel ratio (AFR) may be required (e.g., richer or leaner than stoichiometry). Therein, the controller may adjust the fuel injection based on the modified airflow amount to provide the desired combustion AFR. For example, the fuel injection may be adjusted to operate the engine leaner than stoichiometry for emissions purposes. In addition to fuel injection adjustments, spark timing adjustments may also be performed based on the modified airflow amount.

At 318, it may be confirmed that the modified airflow (at 314) is higher than the desired airflow. That is, more air (and fuel) is being delivered to the engine than is otherwise required to provide the torque demanded by the operator. As such, as a result of delivering more airflow and fuel than is required, the engine may output more torque than is demanded. That is, there may be excess engine torque being output. Therefore, upon confirming that the modified airflow is more than what is desired, at 320, the routine includes determining the amount of excess torque being produced by the engine. The excess torque may be estimated based on a difference between the modified airflow and the desired airflow. For example, the excess torque may be estimated based on a difference between the second airflow amount and the first airflow amount.

At 322, the routine includes performing a torque actuator adjustment based on the excess torque. This may include applying a load from an electric machine at 324 and/or adjusting an alternate engine torque actuator to reduce engine torque at 326. Specifically, at 324, the routine includes absorbing excess engine torque resulting from the increasing airflow via an electric motor coupled to the engine. As such, when the modified airflow decreases less than expected, and causes the engine to produce more torque than is expected by the operator, a "run-on" feel may be experienced by the operator. This may degrade the vehicle's driveability and the operator's overall drive experience. Thus by absorbing the excess torque, the "run-on" feel can be reduced and overall vehicle driveability can be improved.

Applying negative torque from an electric machine may include increasing a load applied on the engine from one or more of an alternator, an electric motor, and a starter-generator. In still other embodiments, one or more other electric machines coupled to the engine system may be used to apply a load on the engine or driveline. By applying a negative torque from the electric machine coupled to the engine, the excess engine torque generated from the increased airflow can be offset and a net torque output may match the operator's torque demand. The negative torque applied may be based on the greater than demanded airflow with the negative torque applied increased as a difference between the provided airflow and the demanded airflow increases. That is, as a difference between the first (demanded) airflow amount and the second (provided) airflow amount increases, the excess torque may increase, and accordingly, a larger amount of electric machine negative torque may need to be applied.

At 326, the routine includes adjusting an engine torque actuator, for example, adjusting one or more of cam timing and spark ignition timing. By using an alternate engine torque actuator to offset the excess torque, the "run-on" feel can be reduced and overall vehicle driveability can be improved.

For example, during a first condition, the controller may apply negative torque from an electric machine while providing the airflow. Then, during a second condition, the controller may adjust an alternate engine torque actuator (that is, other than the throttle) while providing the airflow. During the first condition, the negative torque applied is based on the greater than demanded airflow while during the second condition, the engine torque actuator adjustment is based on the greater than demanded airflow. Adjusting an engine torque actuator may include adjusting one or more of spark ignition timing and cam timing, the spark timing retarded from MBT as the greater than demanded airflow increases, the cam timing advanced or retarded (based on engine speed conditions) as the greater than demanded airflow increases. For example, based on engine speed and engine breathing effects, cam timing may be adjusted to delay intake valve opening from TDC and/or delay intake valve closing from BDC to lower resulting engine torque.

Further still, during a third condition, the controller may apply a negative torque from the electric machine and adjust one or spark timing and cam timing while providing the greater than demanded airflow.

In one example, the first condition includes a battery state of charge being lower, for example, low enough to support the required negative torque from the electric machine. In comparison, the second condition includes battery state of charge being higher, for example, at an upper limit preventing the electric machine from supporting the desired negative torque but the combustion engine having authority to reduce torque at the current surge limited airflow level (e.g., cam position being within a limit, and spark timing being within the combustion stability limit). Further, the third condition includes a battery state of charge being lower, for example, low enough to support the required negative torque from the electric machine and the combustion engine having authority to reduce torque at the current surge limited airflow level (e.g., cam position being within the limit, and spark timing being within the combustion stability limit).

In this way, responsive to an indication of turbocharger surge, negative torque may be applied on a driveline from an electric machine coupled to an engine while a greater than demanded airflow is provided to the engine. Alternatively, the excess torque from the throttle control can be offset by torque reducing adjustments of alternate engine actuators. In addition, responsive to the surge, one or more of a wastegate coupled to an exhaust turbine and a compressor recirculation valve coupled to the compressor can be opened. The combined approach allows surge and surge related issues (such as NVH issues and turbocharger performance issues) to be addressed without degrading vehicle driveability.

Figure 4:
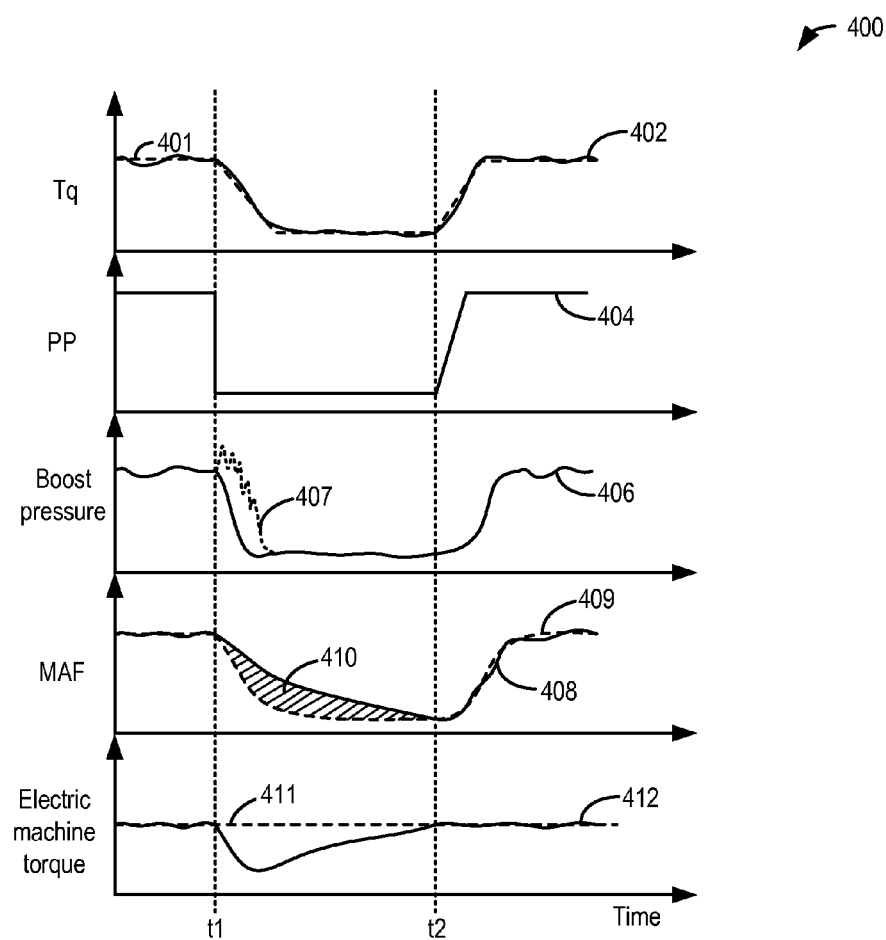
FIG. 4 shows an example torque and airflow adjustment according to the present disclosure.

Now turning to FIG. 4, an example airflow and torque adjustment is shown at map 400. Specifically, map 400 depicts vehicle torque output at plot 402, pedal position at plot 404, boost pressure at plot 406, engine airflow at plot 408 and an electric machine torque applied on the driveline at plot 410. All graphs are plotted over time, along the x-axis.

Prior to t1, a vehicle operator may have applied the accelerator pedal (plot 404), thereby requesting a higher torque output (as shown by driver torque demand at dashed line 401). The higher torque demand may require correspondingly higher engine intake airflow (as shown by desired airflow at dashed line 409). The engine may be operated with boost (plot 406) and with manifold airflow elevated (plot 408) to meet the higher torque demand (as shown by actual torque output at plot 402). In addition, an electric machine coupled to the engine may not be actuated such that it does not add any torque to the driveline. Alternatively, in embodiments where the electric machine in a hybrid-electric motor, the motor may be actuated to provide positive torque to the driveline and augment engine torque output.

At t1, the operator may release the pedal, confirming a tip-out event. In response to the tip-out event, the driver torque demand may drop (plot 401). A controller may open each of a wastegate and a compressor recirculation valve to reduce boost pressure responsive to the tip-in. As such, due to the drop in driver torque demand, an amount of engine airflow desired may correspondingly drop (plot 409). However, to reduce the likelihood of compressor surge, an engine controller may limit the reduction in engine airflow. Specifically, as shown at plot 408 (solid line), the controller may provide greater airflow than is demanded. The controller may reduce the engine airflow at a slower rate and to a higher level (see plot 408) than is desired (see plot 409). The controller may also adjust fuel injection based on the engine airflow adjustment to maintain engine operation at a desired air-fuel ratio (e.g., at stoichiometry or rich or lean, as determined by the operating conditions). As such, when the engine airflow is not controlled to be higher than the desired flow, there may be a surge in boost pressure, as shown by segment 407 (dashed line)

In the absence of any additional torque adjustments, the greater than demanded airflow provided after t1 would result in excess engine torque being generated. As such, the amount of excess torque generated is based on the difference between the demanded airflow and the provided airflow, as shown by shaded segment 410. To absorb the excess torque, the controller may actuate and apply a load from an electric machine coupled the to the engine system so as to apply negative torque (as shown in relation to, dashed, zero torque reference line 411) on the driveline. The controller may apply negative torque from an electric machine including one or more of an alternator, a hybrid-electric motor, and a starter-generator coupled to the engine. The negative torque applied is proportional to the extent of increasing airflow above the initial airflow amount (that is, based on shaded region 410). Specifically, a larger negative torque may be applied as the extent of increasing airflow above the initial airflow amount becomes higher, and as the area of shaded region 410 increases. By applying negative torque from the electric machine on the engine while providing a greater than demanded airflow to the engine, the net torque output provided may match the torque demand (see plots 401 and 402). By providing greater than demanded airflow to the engine responsive to the tip-out, compressor surge is averted.

At t2, the operator may re-apply the pedal, increasing the torque demand. In response to the tip-in at t2, the wastegate and compressor recirculation valve may be closed to increase boost pressure. In addition, the negative torque applied by the electric machine may be removed. Further still, manifold airflow may be adjusted to match the demanded airflow, wherein the demanded airflow is adjusted to provide the operator torque demand.

While not depicted, it will be appreciated that in an alternate example, between t1 and t2, spark timing may be retarded from MBT by an amount based on shaded region 410. Further still, cam timing adjustments may be applied between t1 and t2 based on shaded region 410.

In this way, compressor surge may be addressed during a tip-out while meeting torque demand and without degrading operator drive feel.

In one example, during a first tip-out, a controller may reduce engine airflow at a first, faster rate to meet torque demand. Specifically, during the first tip-out, engine airflow may be reduced to a first level that is based on the torque demand. The first tip-out may include no indication of compressor surge. In comparison, during a second, different tip-out, the controller may reduce engine airflow at a second, slower rate while applying an electric machine load on the engine to meet the torque demand. Specifically, during the second tip-out, engine airflow may be reduced to a second level, higher than the first level. The second tip-out may include an indication of compressor surge. As such, during each of the first and second tip-outs, fuel injection may be adjusted based on the engine airflow to maintain combustion at a desired air-fuel ratio (e.g., to maintain stoichiometric combustion).

During the second tip-out, the reducing of engine airflow may be based on a surge limit, with the second rate reduced further as a compressor ratio (or compressor flow) exceeds the surge limit. The electric machine load applied may be based on a difference between the torque demand and a torque resulting from the reduced engine airflow, with the electric machine load applied increased as the difference increases. The electric machine load may be applied from one or more of an alternator, a starter-generator, and a hybrid-electric motor. The starter-generator may be a crank-integrated starter-generator or a belt driven integrated starter generator.

In a further example, during a third tip-out, the controller may reduce engine airflow at the second, slower rate while retarding spark timing to meet the torque demand. Specifically, during the second tip-out, spark may be retarded from MBT based on a difference between the torque demand and a torque resulting from the reduced engine airflow. In another example, a hybrid vehicle system may comprise an engine for providing propulsion power, an electric motor for also providing propulsion power, a pedal for receiving an operator torque demand, a starter-generator for starting the engine, and a compressor for providing a boosted aircharge to the engine. The vehicle system may further include a controller with computer readable instructions. The controller may include, for example, a reference governor, configured to modify engine airflow demanded based on various operating conditions, such as based on an indication of compressor surge. In response to a tip-out, the controller (or reference governor), may reduce engine airflow, the reducing limited based on a surge limit of the compressor. Concurrently, the controller may increase an electric machine load applied on the engine based on the limited reducing to meet the operator torque demand. The reducing of engine airflow being limited based on a surge limit may include reducing engine airflow to a lower airflow amount when a compressor ratio (or compressor flow) is further away from the surge limit. Herein, the lower airflow amount may be based on the operator torque demand. The engine airflow may be controlled to a higher airflow amount as the compressor ratio (or compressor flow) approaches the surge limit. Increasing an electric machine load applied on the engine based on the limited reducing may include estimating an excess torque resulting from the reduced engine airflow (by estimating an excess airflow resulting from the reduced engine airflow and estimating an excess torque resulting from the excess airflow), and increasing the electric machine load to absorb the excess torque. The electric machine load applied may include a load from one or more of the alternator, the (crank-integrated or belt-driven integrated) starter-generator, and the electric motor.

In this way, engine airflow is modified to reduce compressor surge. By decreasing engine airflow by a smaller amount and at a slower rate during a tip-out, the pressure differential across a compressor is reduced, moving the compressor ratio (or compressor flow) further away from a surge limit. As such, this reduces surge related issues, such as NVH, driveability, and turbocharger performance issues. By concurrently applying a load from an electric machine, the negative torque provided by the electric machine can be used to absorb the excess torque resulting from the excess airflow. Alternatively, by concurrently applying spark timing and/or cam timing adjustments, the excess torque can be offset. By compensating for the excess torque, a "run-on" feel experienced by the driver is reduced, improving operator drive feel. Overall, surge is reduced while meeting torque demand and without degrading vehicle driveability.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
via an electronic controller of the engine, responsive to an indication of turbocharger surge, applying negative torque from an electric machine coupled to the engine while providing an airflow to the engine greater than a demanded airflow, the demanded airflow determined based on an operator torque demand,
wherein applying negative torque from the electric machine includes increasing a load applied on the engine from one or more of an alternator, an electric motor, and a starter-generator, and wherein providing the airflow greater than the demanded airflow includes providing a greater than demanded throttle flow to the engine.

2. The method of claim 1, wherein responsive to the indication of turbocharger surge includes responsive to a likelihood of turbocharger surge and before an occurrence of surge of a compressor of a turbocharger, and wherein the applying negative torque while providing the airflow to the engine greater than the demanded airflow is responsive to the indication of turbocharger surge during a decrease in operator torque demand.

3. The method of claim 1, wherein providing the airflow to the engine greater than the demanded airflow to meet the torque demand includes providing an airflow that is greater than an airflow amount required to meet the torque demand, while combusting the engine at stoichiometry, where the torque demand is received at the electronic controller from an operator based on a pedal position.

4. The method of claim 3, wherein the airflow greater than the demanded airflow is based on a surge limit of a turbocharger.

5. The method of claim 4, wherein applying negative torque includes applying negative torque based on the airflow greater than the demanded airflow, the negative torque applied increased as a difference between the provided airflow and the demanded airflow increases.

6. The method of claim 2, further comprising, responsive to the indication of turbocharger surge, increasing an opening of one or more of a wastegate coupled to an exhaust turbine and a compressor recirculation valve coupled to an intake compressor of the turbocharger and wherein the decrease in torque demand is determined based on an operator pedal tip-out.

7. A method for an engine, comprising:
via an electronic controller of the engine:
operating the engine at stoichiometry with an initial airflow amount based on a driver demanded torque;
responsive to compressor surge, increasing airflow above the initial airflow amount while maintaining operation at stoichiometry; and
absorbing excess engine torque resulting from the increasing airflow via an electric motor coupled to the engine.

8. The method of claim 7, wherein an extent of increasing airflow above the initial airflow amount is based on a surge limit of a compressor, where the surge limit includes a surge line for a given compressor pressure ratio and compressor flow rate, the airflow increased further above the initial airflow amount as the compressor pressure ratio approaches or exceeds the surge limit and wherein the increasing airflow above the initial airflow amount is further responsive to an operator pedal tip-out.

9. The method of claim 8, wherein absorbing excess torque via the electric motor includes applying negative torque from the electric motor coupled to the engine, the electric motor including one or more of an alternator, a hybrid-electric motor, and a starter-generator.

10. The method of claim 9, wherein the negative torque applied is proportional to the extent of increasing airflow above the initial airflow amount, a larger negative torque applied as the extent of increasing airflow above the initial airflow amount becomes higher.

11. The method of claim 7, further comprising, responsive to the compressor surge, opening one or more of a wastegate coupled to an exhaust turbine and a compressor recirculation valve coupled to a compressor and wherein the driver demanded torque is determined based on a pedal position.

12. A method for a boosted engine, comprising:
via an electronic controller of the engine:
during a first tip-out, reducing engine airflow at a first, faster rate to meet torque demand; and
during a second, different tip-out, reducing engine airflow at a second, slower rate while applying an electric machine load on the engine to meet the torque demand.

13. The method of claim 12, wherein the first tip-out includes no indication of compressor surge and wherein the second tip-out includes an indication of compressor surge and wherein the first tip-out and the second tip-out include a drop in torque demand determined based on a release of an accelerator pedal of a vehicle in which the engine is installed.

14. The method of claim 13, wherein during each of the first and second tip-outs, fuel injection is adjusted based on the reduced engine airflow to maintain stoichiometric combustion and wherein reducing engine airflow at the second, slower rate includes decreasing the engine airflow less than during the first tip-out.

15. The method of claim 13, wherein during the second tip-out, the reducing is based on a surge limit, the second rate reduced further as a compressor ratio exceeds the surge limit, and wherein the electric machine load applied is based on a difference between the torque demand and a torque resulting from the reduced, surge limited engine airflow, the electric machine load applied increased as the difference increases, the electric machine load applied from one or more of an alternator, a starter-generator, and a hybrid-electric motor.

16. The method of claim 12, wherein during the first tip-out, engine airflow is reduced to a first level that is based on the torque demand, and wherein during the second tip-out, engine airflow is reduced to a second level, higher than the first level and wherein reducing the engine airflow at the second, slower rate includes limiting throttle flow reduction in response to the second tip-out.

17. A hybrid vehicle system, comprising:
an engine for providing propulsion power;
an electric motor for also providing propulsion power;
a pedal for receiving an operator torque demand;
a starter-generator for starting the engine;
a compressor for providing a boosted aircharge to the engine; and
a controller with computer readable instructions for:
in response to an operator pedal tip-out,
reducing engine airflow, the reducing limited based on a surge limit of the compressor; and
increasing an electric machine load applied on the engine based on the limited reducing to meet the operator torque demand.

18. The system of claim 17, wherein the reducing limited based on the surge limit includes reducing engine airflow to a lower airflow amount when a compressor ratio is further away from the surge limit, the lower airflow amount based on the operator torque demand, and reducing engine airflow to a higher airflow amount as the compressor ratio approaches the surge limit, further comprising a throttle disposed upstream of the compressor, and wherein the reducing limited based on the surge limit includes limiting closing of the throttle based on the surge limit.

19. The system of claim 18, wherein increasing the electric machine load applied on the engine based on the limited reducing includes, estimating an excess torque resulting from the reduced engine airflow, and increasing the electric machine load to absorb the excess torque, wherein the electric machine load includes a load from one or more of an alternator, the starter-generator, and the electric motor, the start-generator including a crank-integrated starter-generator and a belt-driven integrated starter-generator.

20. A method for a boosted engine, comprising:
via an electronic controller of the engine:
responsive to an indication of turbocharger surge,
providing an airflow to the engine greater than a demanded airflow, the demanded airflow determined based on operator torque demand; and
during a first condition, applying negative torque from an electric machine while providing the airflow; and
during a second condition, adjusting an engine torque actuator while providing the airflow.

21. The method of claim 20, wherein the airflow greater than the demanded airflow is a first airflow amount that is greater than a second airflow amount required to provide a demanded torque based on an accelerator pedal position and wherein during the first condition, the negative torque applied is based on the airflow greater than the demanded airflow and wherein during the second condition, the engine torque actuator adjustment is based on the airflow greater than the demanded airflow.

22. The method of claim 20, wherein adjusting the engine torque actuator includes adjusting one or more of spark ignition timing and intake valve opening and closing timing, the spark timing retarded as the airflow greater than the demanded airflow increases, the intake valve timing retarded as the airflow greater than the demanded airflow increases and wherein the providing the airflow greater than the demanded airflow is responsive to the indication of turbocharger surge and a throttle of the engine closing.

23. The method of claim 20, further comprising, during a third condition, applying the negative torque from the electric machine and adjusting one or more of spark timing and valve timing while providing the airflow greater than the demanded airflow.

24. The method of claim 23, wherein the first condition includes a battery state of charge being low enough to support the negative torque from the electric machine, wherein the second condition includes one or more of the battery state of charge being at an upper limit preventing the electric machine from supporting the desired negative torque, cam position being within a limit, and spark timing being within a combustion stability limit, and wherein the third condition includes the battery state of charge being low enough to support the negative torque from the electric machine, and one or more of the cam position being within the limit and spark timing being within the combustion stability limit.

* * * * *